Dec. 21, 1937.  F. D. CAMPBELL  2,102,786
VENTED NOZZLE
Original Filed Nov. 14, 1931  2 Sheets-Sheet 1

Inventor
Frank D. Campbell.
By Jones, Addington, Ames & Seibold.
Attys.

Dec. 21, 1937.  F. D. CAMPBELL  2,102,786
VENTED NOZZLE
Original Filed Nov. 14, 1931   2 Sheets-Sheet 2
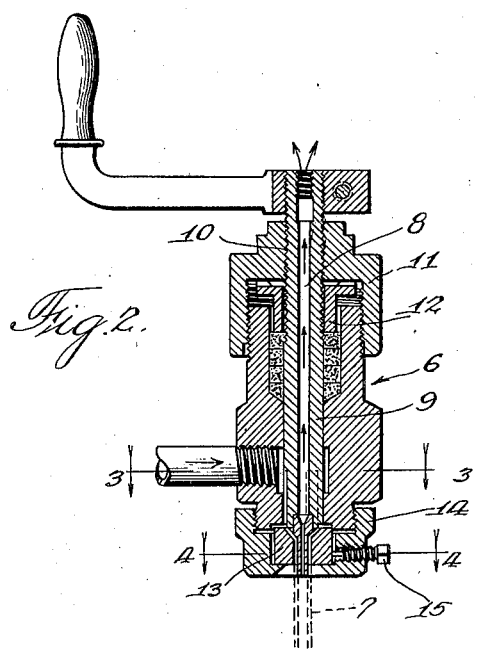
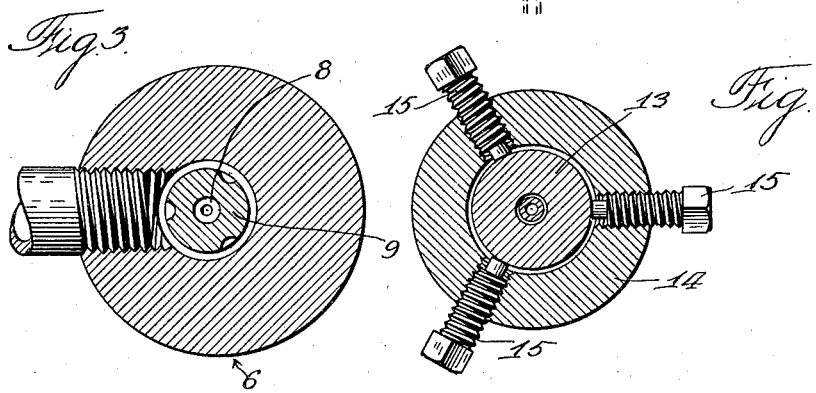

Patented Dec. 21, 1937

2,102,786

UNITED STATES PATENT OFFICE 2,102,786

VENTED NOZZLE

Frank D. Campbell, Cedar Rapids, Iowa, assignor to The Quaker Oats Company, Chicago, Ill., a corporation of New Jersey Original application November 14, 1931, Serial No. 575,086, now Patent No. 2,036,681, dated April 7, 1936. Divided and this application September 19, 1935, Serial No. 41,213

3 Claims. (Cl. 107—14)

My invention relates to the extrusion of cooked plastic material.

This application is a division of my copending application Serial No. 575,086, filed November 14, 1931, which has matured into Pat. No. 2,036,681 of April 7, 1936.

One of the objects of my invention is to provide improved apparatus for extruding a tube of plastic material subject to internal pressure, having provisions for preventing the internal pressure from rupturing the tube or causing it to swell too much.

A further object is to provide an extrusion nozzle having provisions whereby it may be made adjustable to vary the flow of plastic material and to facilitate the flow of material in case it becomes clogged.

Further objects will appear from the description and claims.

In the drawings, in which an embodiment of my invention is shown,

Fig. 2 is an axial section of the nozzle;

Fig. 3 is a section on line 3—3 of Fig. 2; and

Fig. 4 is a section on the line 4—4 of Fig. 2.

Figure 1:
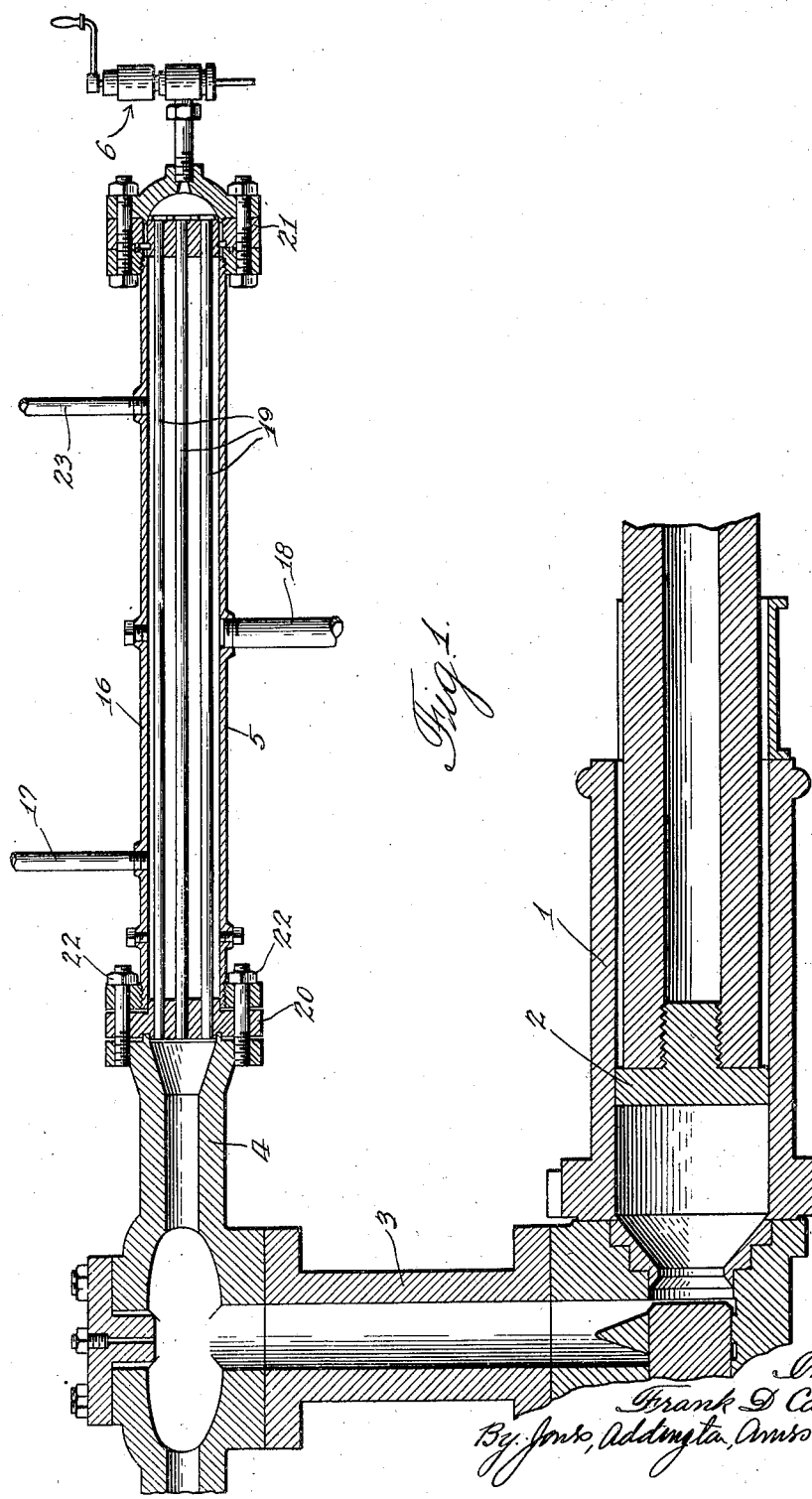
Figure 1 is a vertical sectional view showing an extrusion cylinder and cooker with which my improved nozzle is used.

Referring to the drawings in detail, the construction shown comprises an extruding cylinder 1, an extruding piston 2 for extruding the plastic material from the cylinder, a vertical tubular member 3 through which the plastic material is forced from the cylinder 1, a horizontal tubular member 4 through which the material is forced from the vertical tubular member 3, a cooking cylinder 5 to which the plastic material is supplied from the horizontal tubular member 4, and an extrusion nozzle 6 leading from the cooking cylinder. The extrusion nozzle is designed to extrude the cooked plastic food material in the form of a plastic tube 7, as shown in Fig. 2.

In order to prevent the tube of extruded material from rupturing, due to the formation of steam within the tube on being released from the extrusion nozzle, an air vent 8 is provided as shown in Fig. 2 through the central core 9 of the extrusion nozzle 6. This vent reduces the pressure in the tube 7 below the rupture point, although sufficient pressure may be developed to cause a slight expansion of the tube on leaving the nozzle. This central core 9 is made axially adjustable in order to enable the flow of plastic material to be varied and to facilitate the flow of material in case it becomes clogged. This axial adjustment is effected by providing a screw threaded connection 10 between the upper end of the core 9 and the retaining nut 11 for the packing gland 12.

To enable the ring portion 13 of the extrusion nozzle to be accurately centered with respect to the core portion 9, it is made laterally shiftable in a retaining nut 14 threaded on the lower end of the nozzle. Lateral adjustment of the ring in any direction may be effected by the use of the three adjusting screws 15 shown in Figs. 2 and 4.

The dough or other plastic material flows from the cooking cylinder 5 through the annular space between the core 9 and the bore in the nozzle 6 and thence through the annular space between the ring portion 13 and the tip portion of the core, causing the dough to be extruded in tubular form.

The cooker construction shown in section in Fig. 1 comprises a steam chamber 16 having a steam inlet 17 and outlet 18 and a plurality of tubes 19 leading from one end to the other of the steam chamber through which the dough or other plastic material is forced from the tubular member 4.

The ends of the tubes are seated in the header plates 20 and 21 which are so constructed that the entire nest of tubes and header plates may be removed as a unit from the steam chamber for purposes of cleaning or repairing. To enable this to be accomplished, the right-hand header plate 21 is made slightly smaller in diameter than the internal diameter of the steam chamber 16 so that by removing the nuts 22 and disconnecting the cooker from the header, the entire nest of dough tubes 19 may be slipped out of the steam chamber 16 by moving the nest of tubes to the left (Fig. 1).

In order to enable the attendant to prevent the dough in the dough tubes from getting burnt in case the flow of dough is temporarily suspended, means are provided for cutting off the supply of steam to the steam chamber and for admitting a supply of cold water thereto through the water supply pipe 23 leading to the steam chamber 16.

It will be seen that the nozzle construction disclosed has provision for relieving the internal pressure in the plastic tube, thus preventing the tube from rupturing or swelling too much.

Modifications will be apparent to those skilled in the art, and I desire, therefore, to be limited only by the prior art and the scope of the appended claims.

Having thus described my invention, what I claim and desire to secure by Letters Patent is:

1. A nozzle construction for extruding a tube of plastic material subject to internal pressure, comprising a casing having an inlet and an outlet for the passage of the plastic material, a core in said casing and extending into said outlet to provide an annular orifice, and a packing gland through which said core passes, said core having a vent passage affording communication between the interior of the tube and the atmosphere and passing through said packing gland.

2. A nozzle construction for extruding a tube of plastic material subject to internal pressure, comprising a casing having an inlet and an outlet for the passage of the plastic material, a core in said casing and extending into said outlet to provide an annular orifice, and a packing gland through which said core passes, said core having a vent passage affording communication between the interior of the tube and the atmosphere and passing through said packing gland, said core being axially adjustable in said packing gland to vary the flow of plastic material and to facilitate the flow of material in case it becomes clogged.

3. Apparatus for forming a tubing from plastic material containing moisture comprising means for heating a plastic moisture containing material to a temperature above the atmospheric boiling point of the moisture, an extruding nozzle construction, and means for forcing the heated plastic material into and through the extruding nozzle, said extruding nozzle construction comprising an annular orifice having a central core, said core having an open passage leading from the interior of the extruded tube to the atmosphere to relieve the internal pressure in the tube due to the gas formed as the extruded material leaves the nozzle.

FRANK D. CAMPBELL.